United States Patent [19]

Schonfeld

[11] Patent Number: 4,468,677

[45] Date of Patent: Aug. 28, 1984

[54] PRINTING APPARATUS

[75] Inventor: Arnold Schonfeld, Norristown, Pa.

[73] Assignee: Sperry Corporation, New York, N.Y.

[21] Appl. No.: 411,775

[22] Filed: Aug. 26, 1982

[51] Int. Cl.³ .......................... G01D 9/42; H05B 1/00

[52] U.S. Cl. ................................ 346/107 R; 219/216

[58] Field of Search ............ 346/76 R, 107 R, 110 R; 219/216

[56] References Cited

U.S. PATENT DOCUMENTS

| | | | |
|---|---|---|---|
| 3,452,181 | 6/1969 | Stryjewski | 219/216 |
| 3,827,962 | 7/1974 | Mailloux | 178/15 |
| 3,832,488 | 8/1974 | Fahey | 346/107 R |
| 3,952,311 | 4/1976 | Lapeyre | 346/107 R |
| 4,033,263 | 7/1977 | Richmond | 101/416 A |
| 4,090,206 | 5/1978 | Pfeiffer | 346/107 R |
| 4,177,469 | 12/1979 | Peterson | 346/110 R |
| 4,193,078 | 3/1980 | Esposito | 346/76 R |
| 4,213,136 | 7/1980 | Jenkins | 346/110 R |
| 4,335,967 | 6/1982 | Pawletko | 346/165 |

*Primary Examiner*—George H. Miller, Jr.
*Assistant Examiner*—M. Reinhart
*Attorney, Agent, or Firm*—James R. Bell; Thomas J. Scott; Marshall M. Truex

[57] ABSTRACT

A low-cost printer is provided for use with data processing equipment. A light-shielding retainer provides a substantially continuous sheet supply of printing medium including a conductive-resistant coating formed in strips which is light sensitive and heat developed. The medium is moved past a processing station. A first portion of the station includes an array of light emitting elements and a second portion includes an element for heating the medium sufficient for developing the medium thus visibly exposing and fixing the characters on the medium.

7 Claims, 2 Drawing Figures

PRINTING APPARATUS

BACKGROUND OF THE INVENTION

1. Field of the Invention

This invention relates generally to printing and more particularly to a printing apparatus using a light sensitive, heat developed paper.

2. Description of the Prior Art

Various printing techniques have been used in combination with data processing equipment for printing output of data which has been processed. An example of such a printer is a laser scanner printer which satisfies the requirement of having sufficient printing speed but is expensive to purchase and maintain.

With the advent of the home computer market, excessive moving parts, noise, reliability, maintenance, and size have become important criteria for designing suitable printers. All of these criteria ultimately affect the cost of a printer and excessive cost is a major limitation of present known printers. Generally, reducing the number of moving parts in an apparatus can reduce limitations usually associated with the above-mentioned design criteria resulting in lower cost printers.

The foregoing illustrates limitations of the known prior art. Thus, it is apparent that it would be advantageous to provide an alternative directed to overcoming one or more of the limitations as set forth above. Accordingly, a suitable alternative is providing including features more fully disclosed hereinafter.

SUMMARY OF THE INVENTION

In one aspect of the present invention, this is accomplished by providing a printing apparatus including a retained supply of light sensitive and heat developed printing medium. The medium is moved from the retained supply and past a processing station. A first portion of the processing station includes an array of light emitting elements. A second portion of the processing station includes means for heating said medium sufficient for developing.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 2:
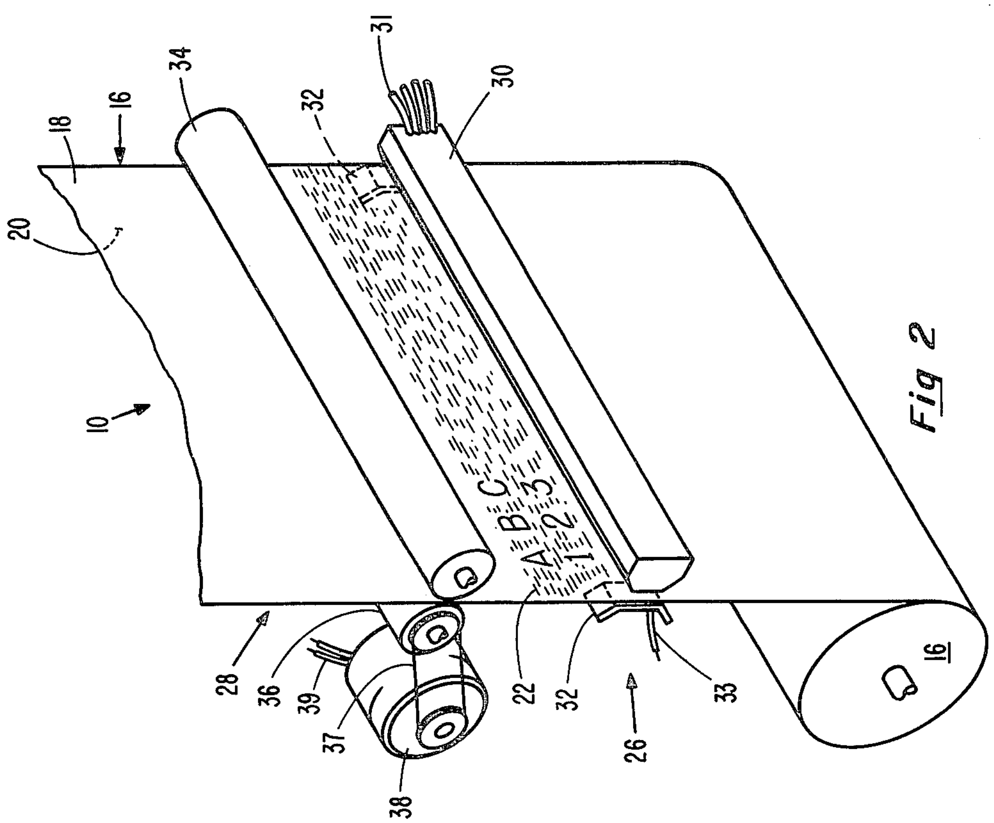
FIG. 2 is an isometric view graphically illustrating features of an embodiment of this invention.
Figure 1:
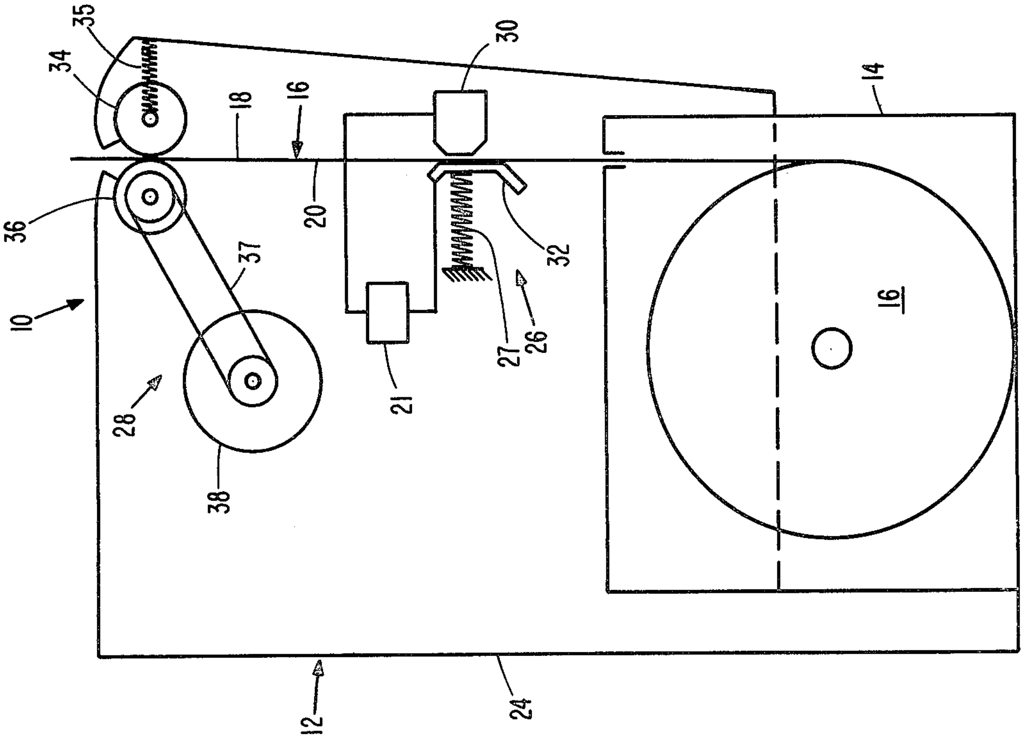
FIG. 1 is a cross-sectional side elevational view graphically illustrating features of an embodiment of this invention.

In FIGS. 1 and 2 a printing apparatus is illustrated in graphical form generally designated 10. A housing 12 (not shown in FIG. 2) is formed of a commercially available material such as a suitable synthetic resin which is light shielding for protecting elements within housing 12 from light exposure. In addition to the material being light shielding, housing 12 is of a construction sufficient to limit light from entering therein.

Housing 12 includes a retainer portion 14 for retaining a substantially continuous supply of commercially available printing medium 16 which is of a construction sufficient to be light sensitive and heat developed. Preferably, medium 16 is in the form of a continuous sheet and includes opposed sides 18, 20, with side 18 being light sensitive. Such medium can receive a light image, and once heated, the medium is developed or cured to the extent that the image becomes fixed thereon and becomes visible. Another portion 24 of housing 12 encloses a print processing station 26 and means 28 for moving medium 16 from retainer 14 past station 26.

Medium 16 is preferably supplied in rolls rotatably mounted by readily available means within retainer 14. In addition, retainer 14 is light shielding and is preferably detachable from portion 24 of housing 12. Such a detachable feature can be accomplished by a variety of known methods. Medium 16 is preferably a version of a dry silver paper product such as type 7773 manufactured by the 3M Corporation.

Station 26 includes a first portion having a printing member 30 operably connected in housing 12 for printing by exposing the medium to appropriately actuated portions of a linear array of light emitting elements such as LED elements representing a dot matrix mode or a segmented alphanumeric character mode. Both modes are within known technology and the dot matrix mode is preferred since it will permit full alphanumeric and graphics capability as opposed to only fixed alphanumeric characters with limited graphics. Printing member 30 is adapted for electrical connection via wires 31.

Station 26 also includes a second portion having heating members or means such as a pair of contacts 32, operably connected in housing 12 and resiliently urged via an exemplary resilient member 27 into engagement with side 20 of medium 16. In one embodiment, side 20 of medium 16 is preferably provided with strips 22 of a conductive resistant coating which electrically connects contacts 32 and heats medium 16 sufficient for developing. Such a coating has heretofore only been provided as a full coating on one side of a medium. This invention discloses applying such coating as a series of equally spaced parallel lines or strips 22 which may, for example, be in the range of from about 0.005" to about 0.020" wide and spaced apart at from about 0.002" mils to about 0.010 mils. In this manner, the medium becomes incrementally developed as each strip 22 is sequentially engaged by contacts 22. The area developed on medium 16 is larger than the area of a strip 22 itself. This area is a function of the voltage applied to the strip 22 and the length of time that the voltage is applied. This permits printing to be positioned anywhere on side 18. Printing member 30 and contacts 32 are opposed and medium 16 passes therebetween. This requires an electrical timing device 21 operably connected to permit the light emitting elements to be exposed to medium 16 prior to heating. Such timing devices are well within known technology. Contacts 32 are adapted for electrical connection via a wire 33. Each strip 22 is continuous but is shown as a dotted line since they are on side 20 of medium 16.

Means are provided for moving medium 16 from retainer 14 past station 26. Such means preferably includes a pair of elongated rubber faced, rotatably mounted rolls 34, 36 provided so that medium 16 passes therebetween. With roll 36 suitably positioned, roll 34 is resiliently urged toward roll 36 by an exemplary resilient member 35. This provides rolls 34, 36 in gripping engagement with medium 16.

Means, such as a known stepping motor 38, are operably provided to rotatably drive roll 36 via a drive belt or chain 37 in a stepped manner for stepped exposure of strips 22 to processing station 26. A suitable solenoid and ratchet device can provide equivalent stepping. Motor 38 is adapted for electrical connection via wires 39.

In operation, medium 16 is drawn between rolls 34, 36 in stepped increments and past station 26 between printing member 30 and heating members 32. Light sensitive side 18 is first exposed to light and then to heat due to current applied by contacts 32 to coated strips 22 on side 20. As a result, printing is accomplished as images become fixed on medium 16. When a roll of medium 16 expires, retainer 14 can be detached and a fresh supply of medium re-attached. Also, it is anticipated that retainers 14 can be provided as cassettes loaded with rolls of medium 16. This will eliminate a need to immediately refill retainer 14 when it becomes empty. In addition, when a new roll of medium 16 is to be started, it may be desirable to mechanically separate contacts 32 from printing member 30 and feed medium 16 past contacts 32 and into rolls 34, 36.

Heating can be provided by an elongated heater element to either surface 18 or 20 of adjacent medium 16. When located adjacent to surface 20, the heating element can be opposite printer 30, or offset to apply heat sufficiently following light exposure, or operably connected to function in timed sequence or may be solenoid actuated to move toward and away from the medium. Also, a heating element (or contacts 32 when using a coated medium) can be spaced from printing member 30 and operated without a timing device such as where the medium first passes a printing member then subsequently, after the medium has traveled a specified distance, the medium can then pass a heater. Various modifications may be made as long as heat does not affect the medium prior to light exposure.

Rolls 34, 36 may be either stepped or continuously driven by a motor rather than step driven by a solenoid. Also, the rolls may be in the form of opposed wheel pairs located at the edges of the medium on either side of printing member 30 rather than being in elongated form as illustrated.

The foregoing has described a low cost printer which is reliable, requires minimal maintenance and has few moving parts. A removable retainer can quickly provide a substantially continuous supply of printing medium. Movement of the medium between a printer and an opposed (or slightly offset) heater provides almost immediate visual perception of desired printed matter. Additionally, when the rolls are in the form of wheel pairs, located as stated above, the printed matter is almost immediately available for removal from apparatus 10.

It is anticipated that aspects of the present invention, other than those specifically defined in the appended claims, can be obtained from the foregoing description and the drawings.

Having thus described the invention, what is claimed is:

1. A printing apparatus comprising:

means for retaining a substantially continuous supply of printing medium, said medium being of a construction sufficient to be light sensitive and heat developed, said printing medium having opposed surfaces, one of said surfaces including a conductive-resistant coating formed in a plurality of strips;

a print processing station;

means for moving said medium from said retainer past said station;

means operable for printing by exposing said moving medium to an image produced by an array of light emitting elements and means operable for incrementally developing said strips of said medium in response to operation of said light emitting elements for fixing said image on said medium, said means for developing including a pair of electrical contacts urged into engagement with said medium.

2. The apparatus of claim 1 including;

means for shielding said medium from light.

3. The apparatus of claim 1 wherein said means for retaining said supply of medium includes a light shielding container detachably connected to said apparatus.

4. The apparatus of claim 1 wherein said means for moving includes a pair of opposed rolls, said medium being between said rolls, and at least one of said rolls being in resilient contact with the other of said rolls and in gripping engagement with said medium.

5. The apparatus of claim 4 including:

means operably connected for driving at least one of said rolls.

6. The apparatus of claim 5 wherein said rolls are step driven by a solenoid.

7. The apparatus of claim 1 including:

means operable for timing actuation of said developing means in response to actuation of said exposing means, said means including a timing member electrically interconnecting said developing means and said exposing means.

* * * * *